United States Patent [19]

Sugda et al.

[11] 4,243,068
[45] Jan. 6, 1981

[54] SEWER CHIMNEY

[76] Inventors: Peter J. Sugda, 30 Walnut St., Enfield, Conn. 06082; Thomas G. Thompson, 4 Pond La., Granby, Conn. 06035

[21] Appl. No.: 51,616
[22] Filed: Jun. 25, 1979
[51] Int. Cl.³ ............................................. F16L 5/00
[52] U.S. Cl. ................................... 137/363; 137/372; 52/21
[58] Field of Search ............... 137/363, 364, 370, 372; 52/21, 19

[56] References Cited
U.S. PATENT DOCUMENTS

| | | | |
|---|---|---|---|
| 1,582,191 | 4/1926 | Snooke | 137/363 |
| 3,212,519 | 10/1965 | Paschen | 137/363 |
| 3,715,958 | 2/1973 | Crawford | 52/21 |
| 4,023,590 | 5/1977 | Harris | 137/363 |

Primary Examiner—Harold W. Weakley
Attorney, Agent, or Firm—Norman S. Blodgett; Gerry A. Blodgett

[57] ABSTRACT

Chimney for joining a lower main sewer line having a vertical nipple to an upper branch sewer line, the chimney consisting of a pre-cast concrete bridge assembly straddling the main line and having a bore through which the nipple extends, the bridge being joined by intermediate sections to a Y-branch section having passages and openings for joining it to the branch line, there being a fluid-tight seal between the bore and the nipple to permit relative movement therebetween without leakage.

9 Claims, 18 Drawing Figures

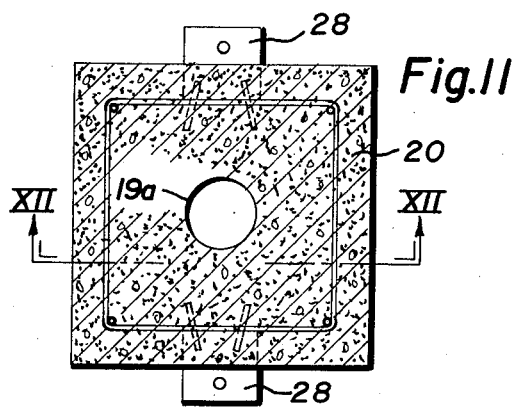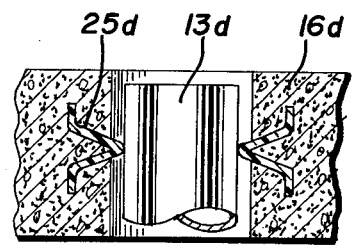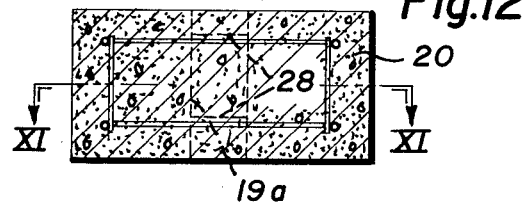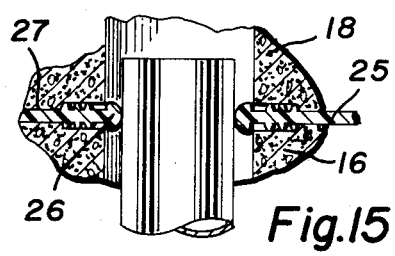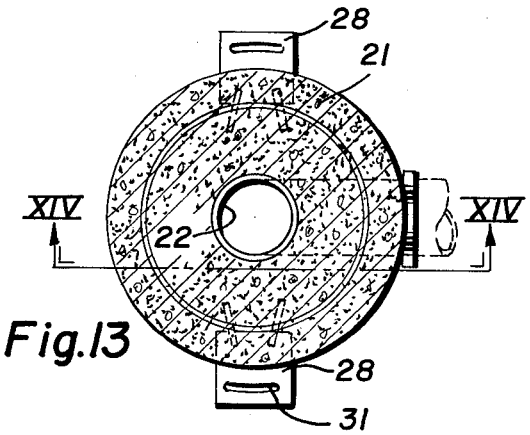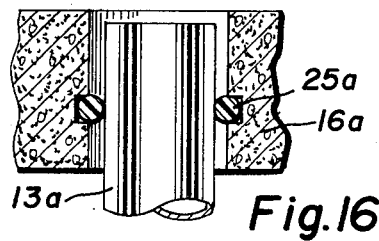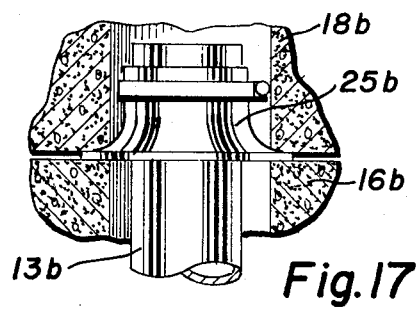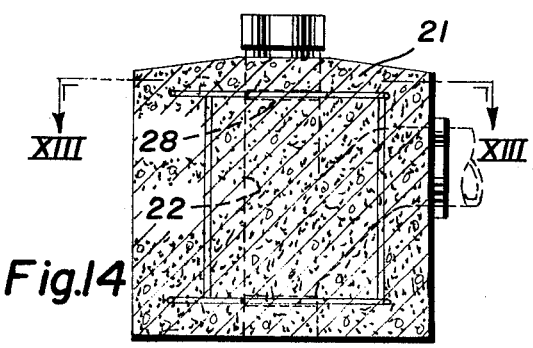

SEWER CHIMNEY

BACKGROUND OF THE INVENTION

In the installation of sewer systems and the like, it is common practice to use a structure known as a "sewer chimney" to join a lower sewer main line to an upper sewer branch line. A sewer chimney is usually constructed as an appurtenance to a deep sewer to allow the branch line (building connection or lateral) to be installed at a shallower depth. These chimneys vary in height and in pipe size, but are commonly 3 to 12 ft. high with a 6" pipe size, these dimensions being typical for a residence or small commercial building. Historically, sewer chimneys have been constructed in place by various methods, some of which are unsatisfactory from a structural standpoint and others of which are time-consuming and expensive. The procedure for building a chimney according to the best available technology would be about as follows:

After the sewer pipe and its associated T-fitting has been installed, a wooden form is built in the trench around the tee. Steel reinforcing bars are sometimes installed and concrete is poured into the form until it reaches a level above the pipe. This concrete (and steel) provides an arch over the sewer pipe and a base for the balance of the chimney structure. The trench must then be kept open and free of water until the concrete has set properly. This should be the case, but it is seldom carried out, due to the cost involved, because of the delay, etc. Excessive water in the trench can also seriously weaken the concrete. The second step (usually the following day) consists of assembling the chimney from sections of pipe and wye branch fittings to the correct elevation. A second form is then constructed around the chimney pipe and fittings for the entire height and concrete is poured into the form. Additional time is required for this concrete to set before the forms can be stripped and before back-filling of the trench can proceed.

Some of the more serious problems connected with this construction technique are that it is a lengthy and costly procedure when performed correctly. Also, subsequent settling of the sewer and/or chimney often results in structural failures, thus allowing infiltration to occur and necessitating expensive repairs. Furthermore, damage to or "loss" of the structure can occur during back-filling, due to the low strength of the concrete at this stage. These and other difficulties experienced with the prior art devices have been obviated in a novel manner by the present invention.

It is, therefore, an outstanding object of the invention to provide a sewer chimney which is of high quality, which is pre-constructed, and which is formed of reinforced concrete ready for on-site assembly.

Another object of this invention is the provision of a sewer chimney, including a reinforced pre-cast concrete bridge structure, which provides an exceptionally strong arch over the sewer and a very stable base, due to its large bearing area; this entire bridge assembly results in the mainline pipe having no bearing weight whatever from the chimney.

A further object of the present invention is the provision of a sewer chimney structure, including a unique sealing arrangement which eliminates infiltration or exfiltration.

It is another object of the instant invention to provide a sewer chimney, including a diaphragm seal which allows for vertical displacement or settling in either the sewer or the chimney structure, thus eliminating the cause of many chimney failures.

A still further object of the invention is the provision of a sewer chimney in which the top section may be rotated to accommodate almost any combination of angles which may be necessary to make a lateral connection.

It is a further object of the invention to provide a sewer chimney formed of sections which are easily stacked vertically and which bolt together to form a rigid structure.

It is a still further object of the present invention to provide a sewer chimney which is inexpensive to purchase and install, which permits the contractor to begin and finish several sewer chimneys in a single day, which permits back-filling of the hole on the same day, and which includes no form work or use of wet concrete.

With these and other objects in view, as will be apparent to those skilled in the art, the invention resides in the combination of parts set forth in the specification and covered by the claims appended hereto.

SUMMARY OF THE INVENTION

In general, the invention consists of a chimney for sewers or the like provided with a pre-cast-concrete, steel-reinforced bridge assembly which is adapted to straddle a main sewer line, the bridge having a bore to receive a vertical nipple extending upwardly from the main line. A pre-cast-concrete, steel-reinforced transitional section is mounted over the bridge and has a central vertical bore overlying the bridge bore for connection at its upper end to an intermediate or Y branch section. A fluid tight flexible seal lies between the bridge bore and the nipple.

More specifically, a transitional section is mounted between the bridge and intermediate or Y branch section and is formed with a vertical bore that joins the bores in the bridge and the cap block. The flexible seal has a laterally-extending flange that is clamped between an upper horizontal surface of the bridge and a lower horizontal surface of the transitional section.

BRIEF DESCRIPTION OF THE DRAWINGS

The character of the invention, however, may be best understood by reference to one of its structural forms, as illustrated by the accompanying drawings, in which:

FIG. 11 is a horizontal sectional view of a basic intermediate element taken on the line XI—XI of FIG. 12, FIG. 12 is a vertical sectional view of the basic intermediate element taken on the line XII—XII of FIG. 11, FIG. 13 is a horizontal sectional view of a cap block taken on the line XIII—XIII of FIG. 14, FIG. 14 is a vertical sectional view of the cap block taken on the line XIV—XIV of FIG. 13, FIG. 15 is a vertical sectional view of a portion of the chimney taken on the line XV—XV of FIG. 3, FIG. 16 is a vertical sectional view of a modified form of the chimney, FIG. 17 is a vertical sectional view of another modification of the invention, and FIG. 18 is a vertical sectional view of another modification of the invention.

DESCRIPTION OF THE PREFERRED EMBODIMENT

Figure 1:
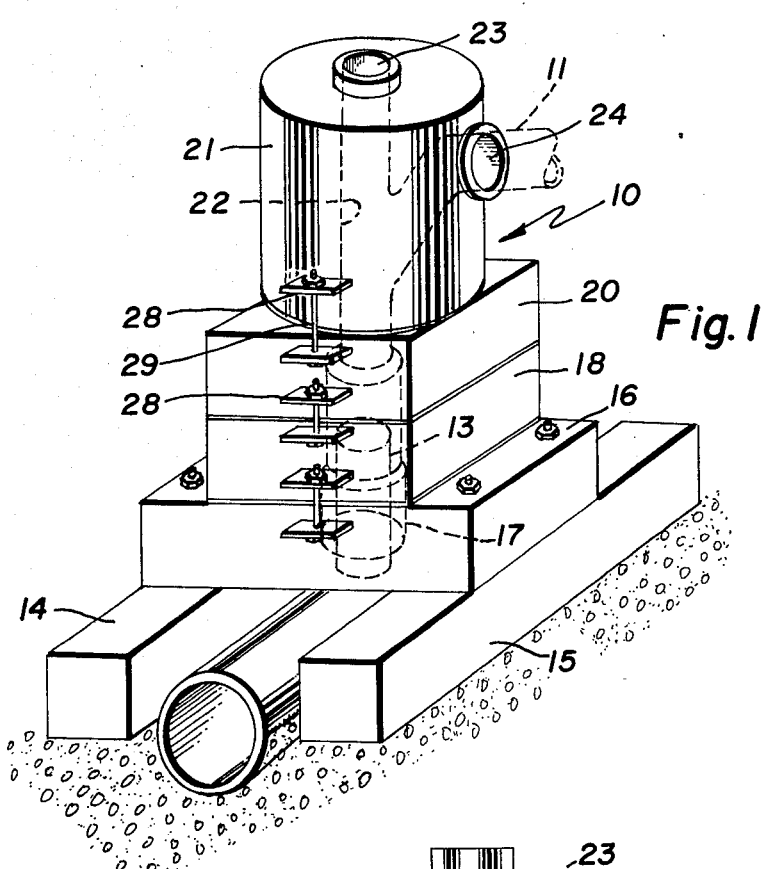
FIG. 1 is a perspective view of a sewer chimney embodying the principles of the present invention.
Figure 2:
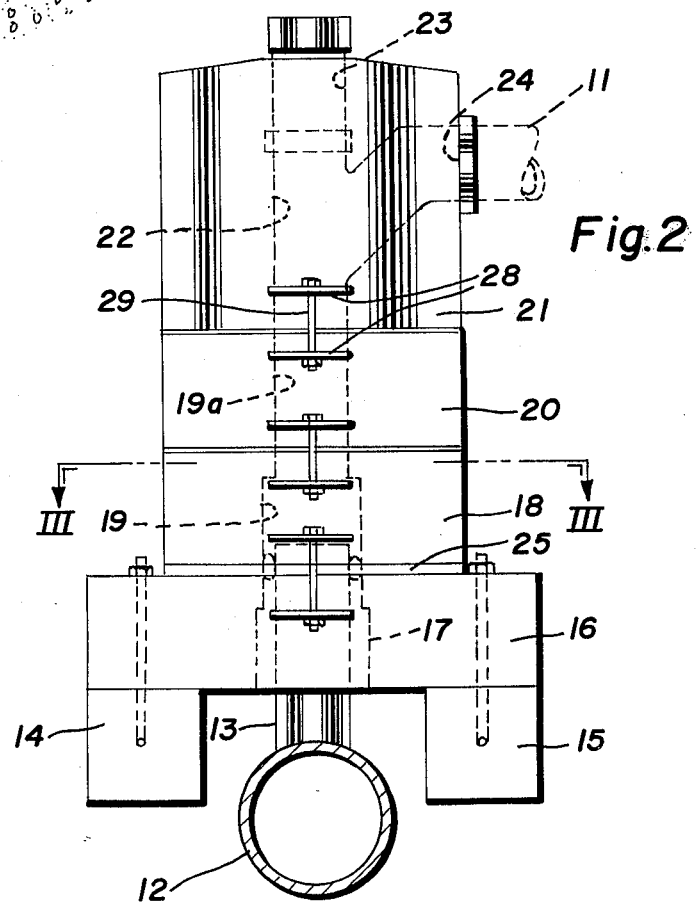
FIG. 2 is a front elevational view of the chimney.
Figure 3:
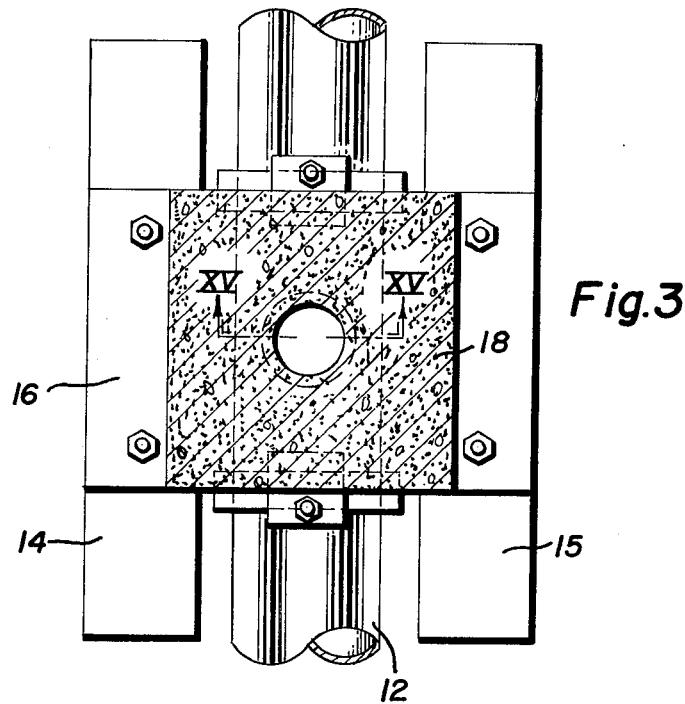
FIG. 3 is a horizontal sectional view of the chimney taken on the line III—III of FIG. 2.

Referring first to FIGS. 1, 2, and 3, wherein are best shown the general features of the invention, the sewer chimney, indicated generally by the reference numeral 10, is shown connecting a shallow branch sewer line 11 to a deeply-buried main sewer line 12. The main line has an upwardly-directed short vertical nipple 13. A first base 14 and a second base 15 are located on opposite sides of the main line 12 and are arranged parallel to and spaced from it. A bridge 16 rests on and is fastened to the first and second bases 14, 15 and passes over the main line 12. The weight of the bridge and subsequent structure is supported by the bases 14 and 15 and not by the main sewer line. The bridge 16 has a vertical bore 17 through which the nipple 13 passes, so that a portion of the nipple extends above the upper surface of the bridge.

A transitional section 18 rests on and is secured to the bridge 16, this section having a bore 19 which is coaxial with and encloses the upper end of the nipple 13. A Y-branch section or a cap block 21 rests on and is secured to an intermediate section 20, the cap block having a bore 22 with a first clean-cut opening 23 coaxial with the bore of the transitional and intermediate sections 18 and 20 and a second opening 24 adapted to connect to a branch sewer line 11.

A chimney bore is defined by the bore 17 in the bridge section, the bore 19 in the transitional section 18, the bore 19A in the intermediate section 20, and the bore 22 in the cap block 21. A diaphragm seal or gasket 25 is arranged to provide a slidable static and dynamic fluid seal between the chimney bore 17 and the nipple 13. Referring to FIG. 15, it can be seen that the gasket 25 is provided with an annular element 26 and an elongated radial flange extending from it, the gasket being positioned axially of the chimney bore with the flange 27 lying between the bridge 16 and the transitional section 18. The auxiliary intermediate section 20 is provided to adjust the intermediate sections to produce a selected vertical distance between the bridge 16 and the cap block 21.

As is best evident in FIG. 1, each of the bridge 16, transitional section 18, auxiliary intermediate section 20, and the cap block 21 are provided with protruding lugs or ears 28 which cooperate with bolts 29 to lock them together.

Figure 4:
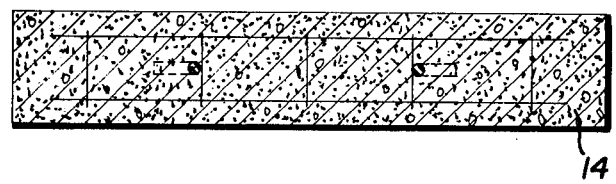
FIG. 4 is a horizontal sectional view of a base element taken on the line IV—IV of FIG. 6.
Figures 5, 6:
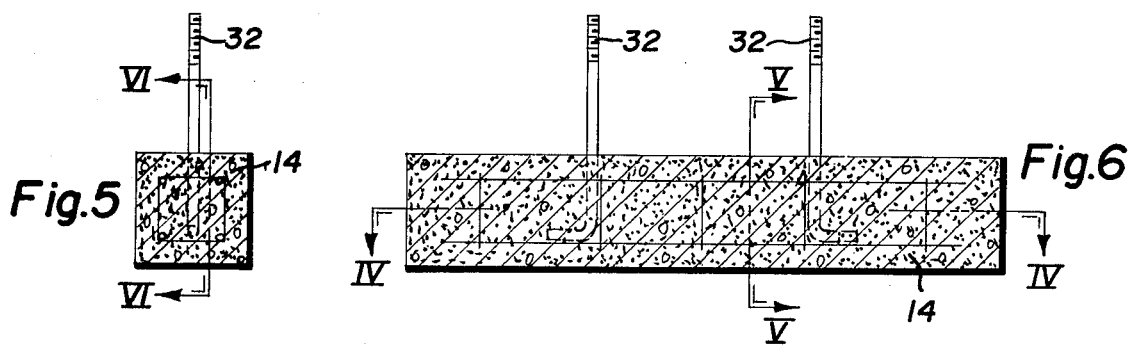
FIG. 5 is a vertical sectional view of the base element taken on the line V—V of FIG. 6.
FIG. 6 is a vertical sectional view of the invention taken on the line VI—VI of FIG. 5.

In FIGS. 4, 5, and 6 it can be seen that the base 14 is formed as a pre-cast concrete member with steel reinforcing rods and cast in place vertical anchor bolts 32. The base 15 is similarly constructed.

Figure 7:
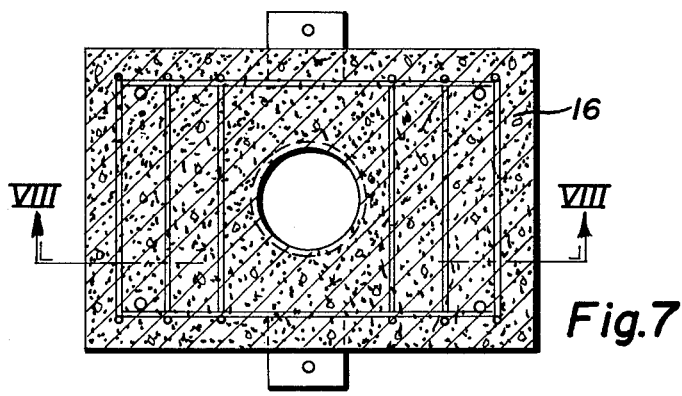
FIG. 7 is a horizontal sectional view of a bridge taken on the line VII—VII of FIG. 8.
Figure 8:
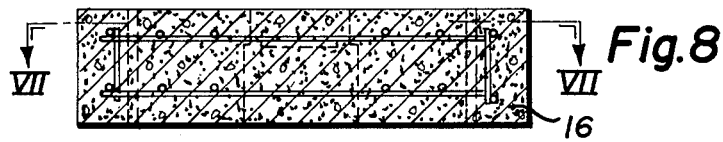
FIG. 8 is a vertical sectional view of the bridge taken on the line VIII—VIII of FIG. 7.

In FIGS. 7 and 8 it can be seen that the bridge 16 is also formed as a pre-cast concrete member with steel reinforcing rods and with steel plates welded to the reinforcing rods and protruding from the concrete to serve as ears 28.

Figure 9:
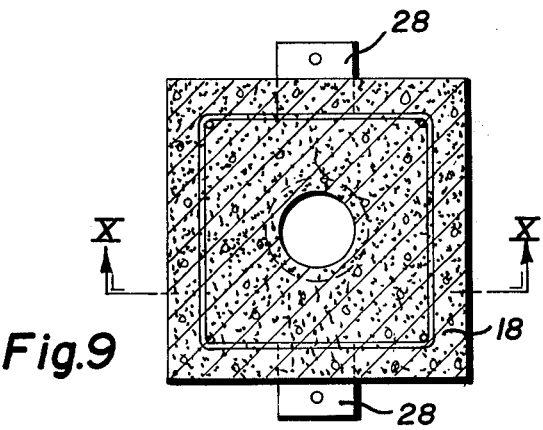
FIG. 9 is a horizontal sectional view of a transitional element taken on the line IX—IX of FIG. 10.
Figure 10:
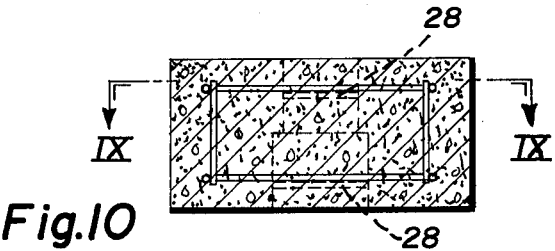
FIG. 10 is a vertical sectional view of the transitional element taken on the line X—X of FIG. 9.

In FIGS. 9 and 10 it can be seen that the transitional section 18 is formed of pre-cast concrete with steel reinforcing rods and steel plates to serve as ears 28. It should also be noted that transitional section 18 has two different babore 19 diameters. The lower diameter bore is sized to accept the nipple 13. The upper bore diameter is sized to accept and line up with bore diameter 19a of the intermediate section 20 or to line up with the bore diameter 22 of section 21, depending on whichever field elevations require.

In FIGS. 11 and 12 it can be seen that the auxiliary intermediate section 20 is similarly formed of pre-cast concrete with steel reinforcing rods and steel plates to serve as ears 28.

FIGS. 13 and 14 show the details of the Y-branch section or cap block 21. It is also formed of pre-cast concrete with steel reinforcing rods and with steel plates to serve as the ears 28. In this case, however, instead of the ears 28 being formed with simple bolt holes (as is true in all of the other sections) the ears of this block are provided with arcuate slots 31 which are concentric with the bore 22 to allow for partial rotation.

FIG. 16 shows a variation of the fluid-tight seal, wherein the elastomer O-ring 25a is held in a groove in the bridge 16a (or any of the other sections), so that its inner surface contacts the outer surface of the nipple 13a.

FIG. 17 shows a seal 25b in the form of a boot having an outwardly-directed flange which is clamped between the bridge 16b and the intermediate or transitional section 18b. It is clamped at its upper end to the nipple 13b by means of a hose clamp.

FIG. 18 shows a variation of the fluid-tight seal, wherein an elastomer seal 25d is cast in the bridge 16d or any of the other precast sections, so that its inner surface contacts the outer surface of the nipple 13d.

The installation and operation of the invention will now be readily understood in view of the above description. The installer should inspect all parts of the prefabricated sewer chimney for any shipping damage; he should not use any parts which may have been damaged in transit. The work on the chimney can begin as soon as the sewer tee and pipe have been installed. At least one length of pipe up and down stream of the tee is required. A short length of PVC pipe or nipple is placed in the vertical tee inlet connection and the end of the pipe is covered to prevent back fill material from getting into the sewer.

Appropriate screened gravel is placed to fill the full width of the trench and for a distance of approximately 4 ft. up and down stream of the tee. The gravel is leveled and compacted until a specification dimension below the top of the vertical bell is reached. A chain is installed between the lug or ears in the bridge assembly and it is lifted with a backhoe or other suitable machinery. The installer should check the bottom of the bridge and remove any pieces of dirt etc. which may have become attached. The temporary cap is removed from the vertical pipe and the bridge is lowered into trench. Two men should guide the bridge 16 with the bases 14 and 15 down over the vertical pipe or nipple 13 until the bridge rests on the gravel fill. In deeper trenches it may be advantageous to use a chain fall to lower the bridge.

The lifting chain is removed and the temporary cap is replaced on the end of the vertical nipple.

The entire area under bridge is filled and compacted with sand and the balance of the area around the bridge is filled with gravel to a level that is even with the top of the bridge. The seal 25 is then installed. A chain is installed between the ears 28 on the pre-cast transitional section 18 and it is lifted with a backhoe or other suitable equipment. The bottom of the section should be inspected to make sure that it is clean and free from mud, dirt, etc. The transitional section is lowered into the trench directly over the vertical nipple. The ears on the section 18 are aligned with those on the bridge. Two men should guide this section down over the vertical pipe until it is resting on the diaphragm seal. The intermediate section 18 is bolted to the bridge assembly using bolts 29.

If an additional auxiliary intermediate section 20 or other sections are added as necessary to reach the required elevation, a special gasket provided must be used between sections and the sections must be bolted together with the hardware. Fill should be added as the structure is built up to insure stability.

Then, a chain is installed between top lifting lugs on the pre-fabricated cap block 21 and it is lifted with a back hoe or other suitable equipment. The bottom should be clean and the special gasket installed on top of the intermediate section. The wye branch section or block is then lowered into place and the ears aligned and bolted. The installer then back-fills and compacts appropriate fill to a point just below the wye inlet and proceeds with the lateral construction.

The advantages of the invention will be evident from the above description. The invention has immediate application to sanitary sewers, storm sewers, and combined sewers. It has application in other areas, such as electrical or telephone conduit installations. The drawing shows a typical 6" pipe size configuration which is common to homes and smaller commercial establishments. A 36" long bridge section will accommodate up to a 12" diameter sewer. Longer bridge sections will accommodate large sewers. Also, the pipe size of the chimney can be made in any standard (or non-standard) pipe or conduit size. The invention features modular, pre-cast, reinforced concrete construction intended to bolt together and it has positive sealing. It also eliminates the costly and time consuming problems associated with conventional on-site, wet concrete construction techniques. Additionally settling is accommodated via the unique sealing arrangement. In the preferred embodiment the design consists of 7 primary elements:

A. The pre-cast, reinforced concrete base pads 14 and 15 which provide greater bearing area when compared to conventional methods of construction, i.e., lower unit soil loadings. They are so arranged as to provide greater stability to the structure, i.e., larger righting moment about the central axis. Also, the manner in which the base pads are arranged allows for backfilling early in the erection process, thereby increasing stability.

B. The pre-cast, reinforced concrete bridge section 16, which provides an exceptionally strong arch over the sewer that virtually eliminates any load on the sewer pipe and/or its fittings, unlike conventional methods. The load (weight of structure plus backfill) is transferred to the base pads. Also, a sufficiently large clearance hole in the center of the bridge eliminates the possibility of undue stress on the short vertical section of pipe rising from the sewer tee.

C. The seal 25 between the bridge structure and the vertical pipe from the tee. The specially-designed diaphragm seal 25 is placed over the vertical pipe from the tee and is located between the bridge 16 and the first transitional section 18. This seal consists of a flat sheet of elastomer material incorporating what is essentially a half O-ring. Practice indicates that a narrow ring-type gasket with concentric ridges should be used between the upper surface of the flange 27 and the under surface of the transitional section 19. This is the preferred seal, because it provides an extremely simple way of effecting a seal between the bridge and the first intermediate section, provides a very effective seal between the structure and the vertical pipe, does not in and of itself limit "travel" due to settling, and is in full view during assembly thereby greatly reducing the possibility of incorrect installation or damage.

The "captive" O-ring seal 25a of FIG. 16 could be installed at almost any elevation in the structure, i.e., in the bridge, transitional, or intermediate section or in the lower part of the Y-branch section.

The "boot" type seal 25b of FIG. 17 is a tapered elastomer tube which would be attached to the vertical pipe by means of a hose clamp and to the structure in a variety of ways, e.g. clamping between the bridge and the first intermediate section or with internal snap ring. The fluid-tight seal 25d of FIG. 18 could be installed at almost any election in the structure, i.e., in the bridge, transitional, or intermediate section or in the lower part of the Y-branch section.

Seals are also used between the intermediate sections and between such sections and the cap block; those can be gaskets (similar to the one described above), such as those made for pipe flanges, e.g. United States Pipe and Foundry Co. flange-type gaskets. The first transitional section 18 is a pre-cast, reinforced concrete section designed primarily to "house", contain or clamp the structure to the pipe seal and to provide vertical clearance for any settling which may occur. The intermediate section 20 is a pre-cast reinforced concrete section to be used to achieve the proper elevation of the finished chimney. These sections can be made in various heights to accomplish their purpose. An internal bore (of the proper size) is integral with each section. The cap block Y-branch 21 is a pre-cast reinforced concrete section incorporating a single, double, triple, or quadtruple, integral Y-branch. The slotted bolt down lugs or ends allow for rotation of the section during assembly to allow for lateral connections at angle of approx. + or −15° to normal. Adapter plates can be attached to the lugs which will provide additional rotation up to 45°±. Lifting lugs and a clean out at the top are also provided.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A sewer chimney for connecting surface branch sewer lines to a deeply buried main sewer line having an upwardly-directed nipple, comprising:
 (a) a first and a second base positioned on opposite sides of the main sewer line, (b) a bridge which rests on the first and second bases and passes over the main sewer line, the bridge having a bore through which the nipple passes, so that a portion of the nipple extends above the bridge, (c) a transitional section which rests on and is secured to the bridge, this section having a bore which is coaxial with and encloses the end of the nipple, and (d) a cap block which rests on and is secured to the transitional section, the cap block having a bore with a first opening coaxial with the bore of the transitional section and a second opening adapted to connect to a branch sewer line, the weight of the bridge, section, and block being supported by the bases and not by the main sewer line.

2. A sewer chimney as recited in claim 1, wherein a chimney bore is formed of the bore in the bridge, the bore in the cap block, and wherein a gasket is arranged to provide a slidable, fluid-tight seal between the chimney bore and the nipple.

3. A sewer chimney as recited in claim 2, wherein the gasket is an annular element having an elongated radial flange extending from it, the gasket being positioned coaxially of the chimney bore, with the flange lying between the bridge and the transitional section.

4. A sewer chimney as recited in claim 3, wherein intermediate sections are provided to adjust the chimney section to produce a selected vertical distance between the bridge and the cap block, the intermediate section resting on and secured to the transitional section, this intermediate section having a bore which is coaxial with the bore of the transitional section, and providing for the larger elevation differences required between lateral and mainline pipes.

5. A sewer chimney as recited in claim 4, wherein each of the bridge, transitional section, and cap block are provided with protruding ears which cooperate with bolts to lock them together.

6. A sewer chimney as recited in claim 5, wherein each of the bridge, chimney sections, and cap block is pre-cast of concrete with reinforcing rods and with steel plates to serve as the said ears.

7. A sewer chimney as recited in claim 4, wherein the ears on the cap block are provided with arcuate slots that are concentric with the bore to permit limited rotational adjustment.

8. Chimney for sewers or the like, comprising
(a) a pre-cast, steel-reinforced bridge adapted to straddle a main line, the bridge having a bore to receive a vertical nipple extending upwardly from the main line,
(b) a pre-cast, steel-reinforced cap block mounted on the bridge and having a central vertical bore overlying the bridge bore for connection at its upper end to a branch line, and
(c) a fluid-tight flexible seal lying between the bridge bore and the nipple.

9. Chimney as recited in claim 8, wherein an intermediate section is mounted between the bridge of the cap block and is formed with a vertical bore that joins the bores in the bridge and cap block, and wherein the seal has a laterally-extending flange that is clamped between an upper horizontal surface of the bridge and a lower horizontal surface of the intermediate section.

* * * * *